US012728443B2

(12) United States Patent
Serstad et al.

(10) Patent No.: US 12,728,443 B2
(45) **Date of Patent: *Sep. 8, 2026**

(54) OPTIMIZING FILLING OF SORTATION ORDER RECEPTACLE

(71) Applicant: Tompkins Robotics, Inc., Orlando, FL (US)

(72) Inventors: James M. Serstad, Orlando, FL (US); Michael C. Futch, Cocoa, FL (US); Parthiban A. Mathavan, Cary, NC (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/218,864

(22) Filed: May 27, 2025

(65) Prior Publication Data

US 2026/0048417 A1 Feb. 19, 2026

Related U.S. Application Data

(63) Continuation of application No. 18/808,166, filed on Aug. 19, 2024, now Pat. No. 12,337,349.

(51) Int. Cl.
*B07C 3/00* (2006.01)
*B07B 1/24* (2006.01)
*B07C 5/36* (2006.01)

(52) U.S. Cl.
CPC ................ *B07C 3/008* (2013.01); *B07B 1/24* (2013.01); *B07C 5/36* (2013.01)

(58) Field of Classification Search
CPC .............. B07C 3/008; B07C 5/36; B07B 1/24
See application file for complete search history.

(56) References Cited

U.S. PATENT DOCUMENTS

| | | | | |
|---|---|---|---|---|
| 6,208,908 | B1 | 3/2001 | Boyd et al. | |
| 11,691,784 | B1 * | 7/2023 | Trautman | B65B 57/06 248/346.02 |
| 12,337,349 | B1 * | 6/2025 | Serstad | B07C 3/008 |
| 2005/0211720 | A1 | 9/2005 | Chirnomas | |
| 2020/0051040 | A1 | 2/2020 | Whitman et al. | |

FOREIGN PATENT DOCUMENTS

| | | | |
|---|---|---|---|
| WO | 2024064747 | A1 | 3/2024 |

* cited by examiner

*Primary Examiner* — Michael Mccullough
*Assistant Examiner* — Kalyanavenkateshware Kumar
(74) *Attorney, Agent, or Firm* — Parthiban A Mathavan

(57) ABSTRACT

System for use in directing a sorting operation includes receptacles configured for receiving articles therein, and a sleeve removably attached to each receptacle such that an upper portion of the sleeve extending upward above a top rim of the receptacle and defining an opening that permits access to the receiving space of the receptacle; and automated transport devices for transporting and depositing articles into the receptacles. The system configured to: assign a first count of articles to a receptacle such that the first count of articles overfills the receptacle and direct the transport devices to transport and deposit the first count of articles into the receptacle after the sleeve is removably attached over a top region of the receptacle.

30 Claims, 12 Drawing Sheets

OPTIMIZING FILLING OF SORTATION ORDER RECEPTACLE

TECHNICAL FIELD

This invention relates generally to the field of warehouse automation, and particularly to systems and methods for automated sortation of articles into receptacles.

BACKGROUND

An article sorting system at a distribution center or warehouse operates to sort articles to destinations with each destination typically represented by a receptacle, which may take the form of a bin, bag, tote, or similar other container. When a receptacle is identified by, for e.g., a photo eye, as having become full, a human operator would remove the receptacle identified to having become full and replace it with an empty one. The full receptacle may then be transferred to a packing station where the articles within the receptacle may need to be rearranged by a packer to fit adequately within the receptacle following which the receptacle is closed or sealed. In practice, it has been observed that a receptacle might not be truly and completely full when the photo eye triggers the "full" signal; such a "false" signal may be the result of one item within the receptacle blocking the sensor even when the receptacle otherwise has vacant space available for receiving additional items.

Nonetheless, adding additional items into this vacant space at the packing station may be impractical, uneconomical, or otherwise unfeasible for numerous reasons. Alternatively, prematurely transferring a receptacle to the packing location before it is actually completely filled up results in wasted space within the receptacle and this introduces inefficiencies within the warehouse operation. For example, the cost of shipping is often determined by the cubic volume (in addition to or in lieu of weight) of the total shipment and unnecessary/additional freight charges may have to be paid to the shipper for the unused, wasted and unproductive space. Additionally, this wasted space also creates a need for additional receptacle exchanges for a given (fixed) quantity of articles being sorted due to a higher number of receptacles being needed to receive the same quantity of articles-leading to additional labor and material cost requirements.

Accordingly, opportunities exist for improving the throughput of an article sorting system by optimizing the receptacle filling approach.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use in directing a sorting operation comprises: a server comprising a memory, a processor, and a receptacle assignment engine; a plurality of receptacles configured for receiving articles therein, each receptacle defined by at least one side wall and a floor that together define a receiving space for one or more articles; a sleeve removably attached to the receptacle such that a lower portion of the sleeve contacts an inner surface of the at least one side wall of the receptacle, with an upper portion of the sleeve extending upward above a top rim of the receptacle and defining an opening that permits access to the receiving space of the receptacle; and one or more automated transport devices for transporting and depositing articles into the receptacles. The system may be configured to: assign a first count of articles occupying a first volume to a receptacle such that the first count of articles overfills the receptacle when all of the first count of articles are deposited thereinto; and direct the one or more automated transport devices to transport and deposit the first count of articles into the receptacle after the sleeve is removably attached over a top region of the receptacle.

According to some embodiments, the first count of articles is compressed such that a total volume of the first count of articles is less than a total volume of the receptacle. According to some embodiments, the first count of articles is compressed manually such that the first count of articles fits into the receptacle. According to some embodiments, the system is further configured to direct the compression of the first count of articles by automated means such that the first count of articles fits into the receptacle. According to some embodiments, the receptacle assignment engine assigns the first count of articles such that no article falls out of the receptacle when all of the first count of articles are deposited thereinto. According to some embodiments, wherein the receptacle assignment engine assigns the first count of articles such that no article falls out of the receptacle throughout a time period when the receptacle is being transported from a first location where the first count of articles is deposited thereinto to a second location of further processing.

According to some embodiments, the receptacle assignment engine calculates a volume of the first count of articles to be deposited into the receptacle. According to some embodiments, the receptacle assignment engine compares the volume of the first count of articles to the volume of the receptacle. According to some embodiments, the sleeve has a total number of sides that matches a number of side walls of the receptacle. According to some embodiments, the receptacle has one of: a circular cross-section with one side wall; a square profile with four side walls; and, a rectangular profile with four side walls. According to some embodiments, the sleeve further comprises at least one pair of ledges that rest on the top rim of the receptacle to thereby prevent the sleeve from falling into the receptacle. According to some embodiments, the sleeve further comprises an opening through which a fill level of the receptacle is detected. According to some embodiments, the sleeve is collapsible. According to some embodiments, the sleeve is foldable. According to some embodiments, the sleeve further comprises at least one handle opening for lifting the sleeve. According to some embodiments, the sleeve further comprises one handle openings on each side wall for lifting or handling the sleeve. According to some embodiments, the fill level of the receptacle is detected by one or more of: a photo eye sensor, a light curtain sensor, an infra-red sensor, an ultrasonic sensor, a visible light sensor, and a LIDAR (Light Detection and Ranging) sensor.

According to one or more embodiments, a sleeve system for use in a sorting operation comprises: a receptacle defined by a floor and at least one side wall that together define a receiving space for one or more articles deposited thereinto by an automated transport device; a sleeve removably attached to the receptacle such that a lower portion of the sleeve contacts an inner surface of the at least one side wall of the receptacle, an upper portion of the sleeve extends upward above a top rim of the receptacle and defines an opening that permits access to the receiving space of the receptacle, and a ledge that rests on the top rim of the receptacle to thereby prevent the sleeve from falling into the receptacle.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings.

As understood by persons skilled in the relevant art, an article sortation system used in a warehouse sorts articles such as, e.g., parcels, units, or any other items that can benefit from the sorting operation, to bins or receptacles. As noted earlier, prematurely transferring a receptacle to the packing season before it is actually fully filled up results in wasted space within the receptacle and this introduces inefficiency within the warehouse operations. While overfilling the receptacle might be an option to address this issue, such over filling of a receptacle may be impractical since it results in articles falling out of the receptacle—both during the filling of the receptacle, and during the of transport of the receptacle to the packing station.

Embodiments of the presently disclosed subject matter advantageously overcome the limitations of the art by providing for systems, apparatus and processes that include a sleeve that is coupled to, or that otherwise cooperates with, a receptacle, wherein such a set up permits, enables, or otherwise allows the overfilling of a receptacle while simultaneously preventing the articles from falling out of the overfilled receptacle—both during the filling of the receptacle and during the transport of the overfilled receptacle to a location of further processing such as, for example, a packing station.

Figure 1:
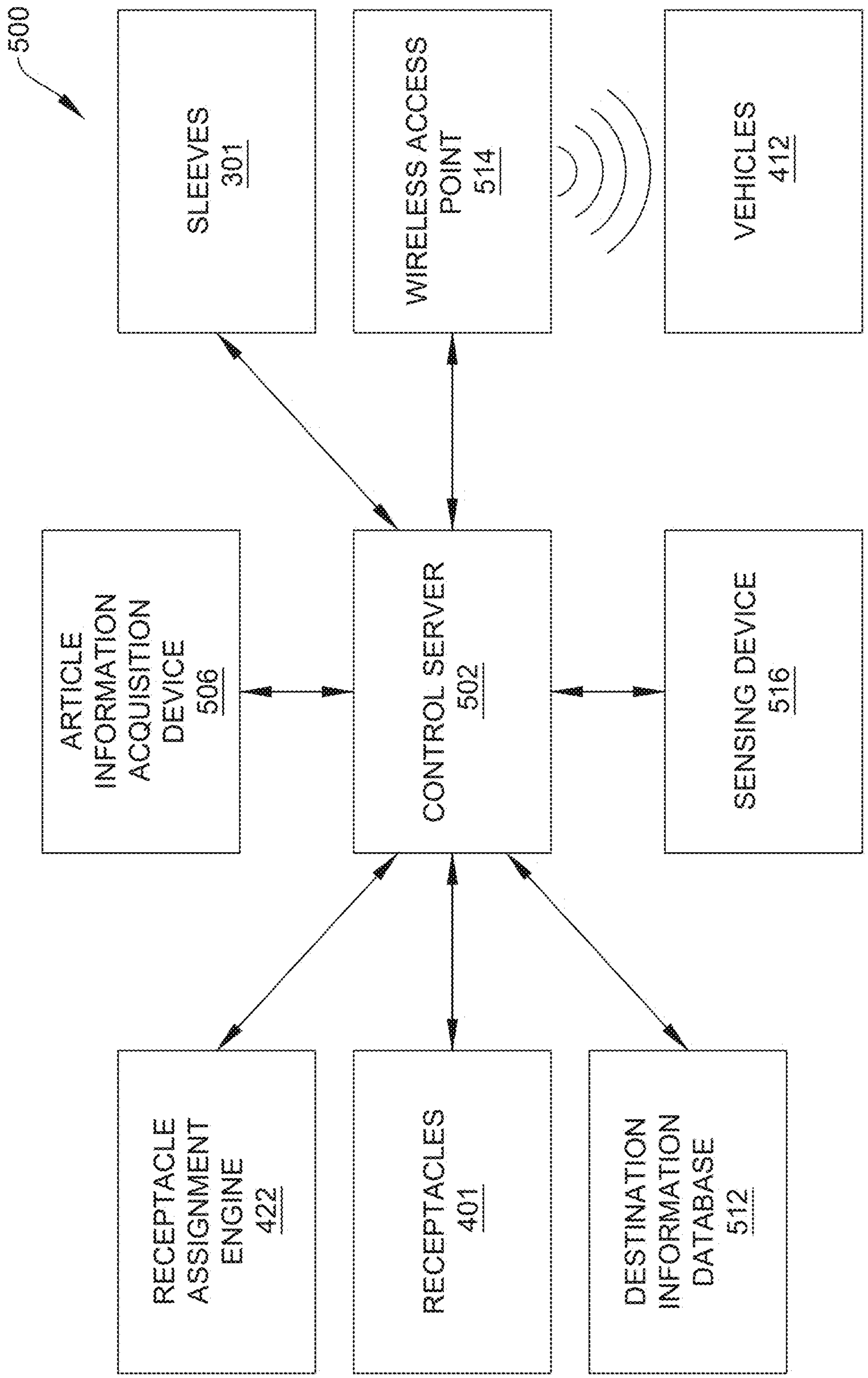
FIG. 1 depicts a block diagram of a sorting system comprising sleeved totes or sleeved receptacles for use in directing a sorting operation such that the filling of a destination receptacle is optimized, according to one or more implementations of the presently disclosed subject matter.
Figure 2:
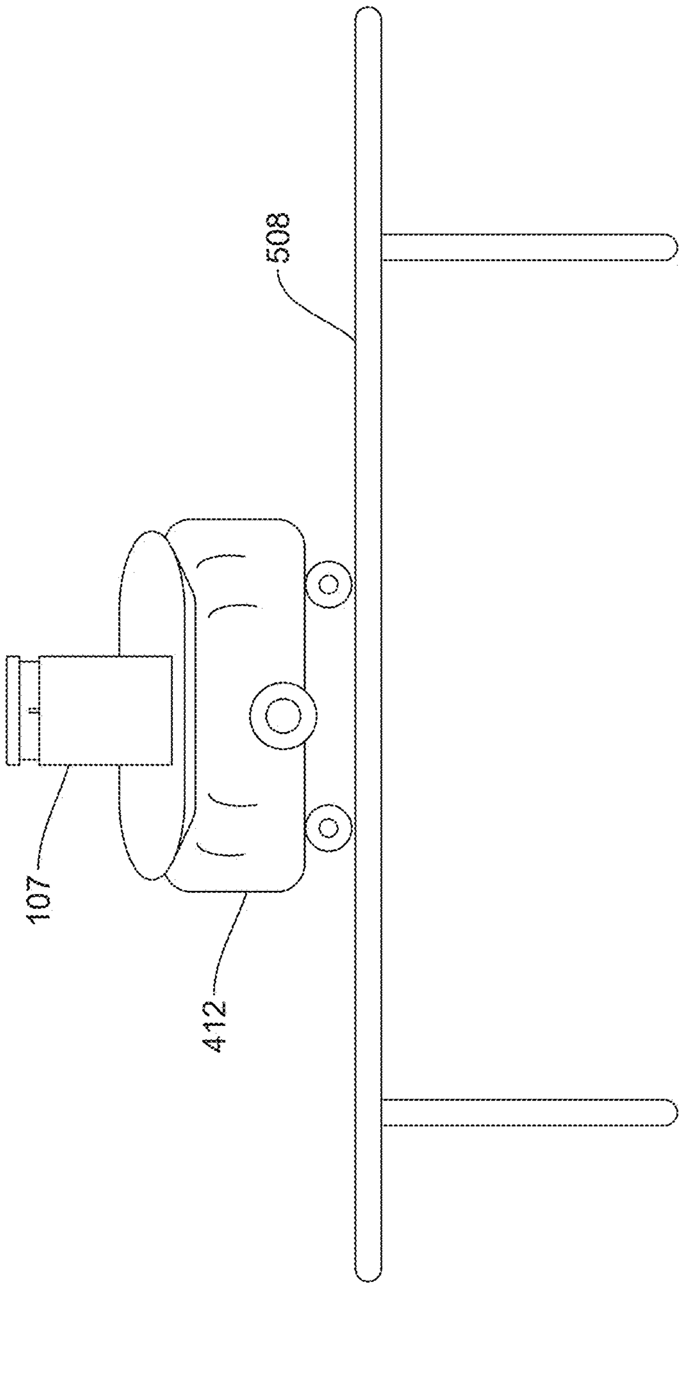
FIG. 2 depicts a side view of an implementation of an automated transport device traveling on a platform to transport an article to be sorted to a destination receptacle, according to one or more implementations of the presently disclosed subject matter.
Figure 3B:
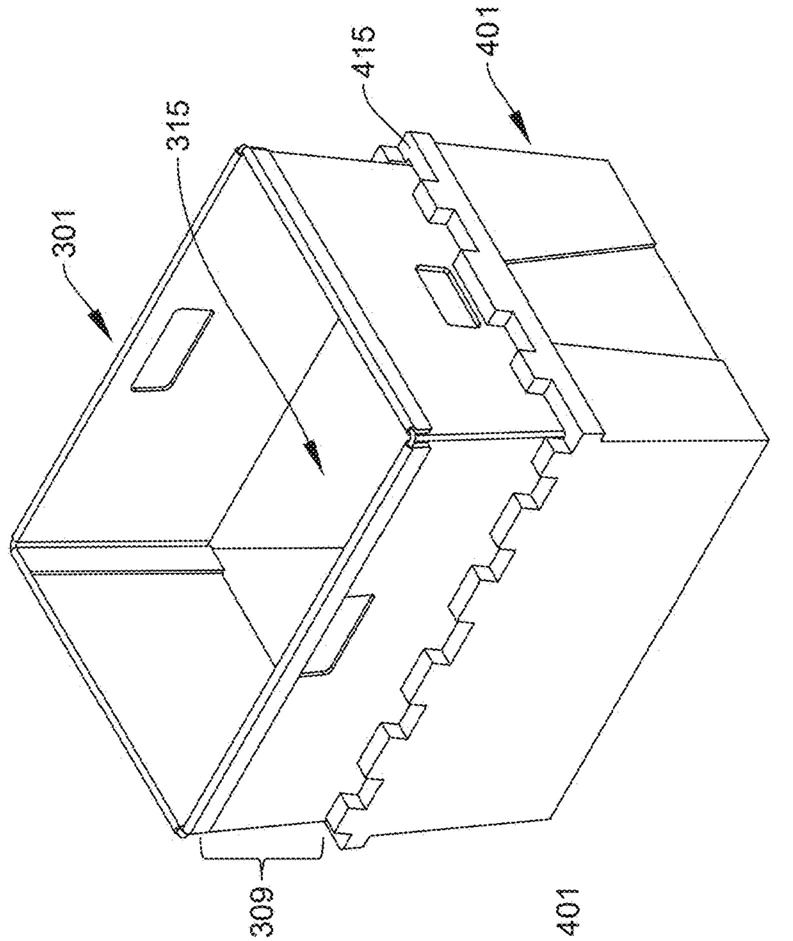
FIGS. 3A and 3B depict perspective views of implementations of a sleeve used with a destination receptacle, according to one or more implementations of the presently disclosed subject matter.
Figure 3A:
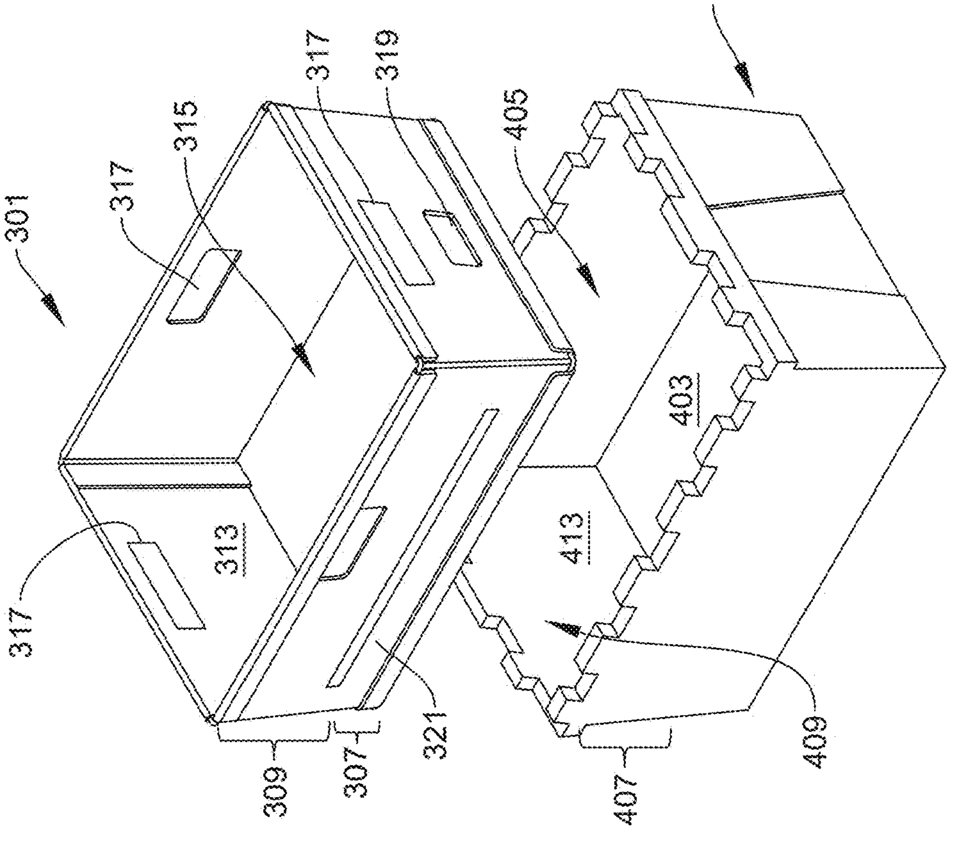
Figure 4:
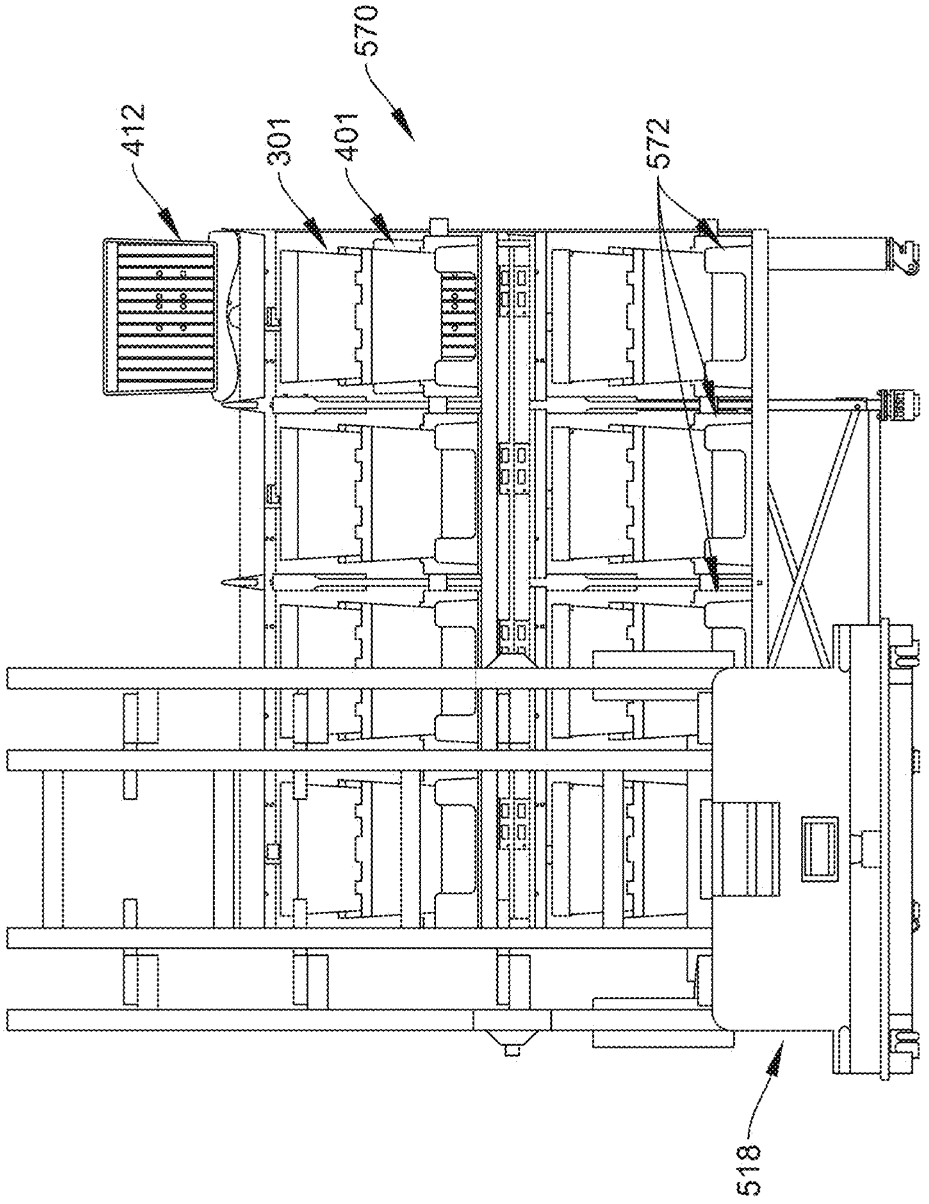
FIG. 4 depicts a side view of a sorting system including sleeved receptacles for use in a sorting operation, according to one or more implementations of the presently disclosed subject matter.
Figure 5:
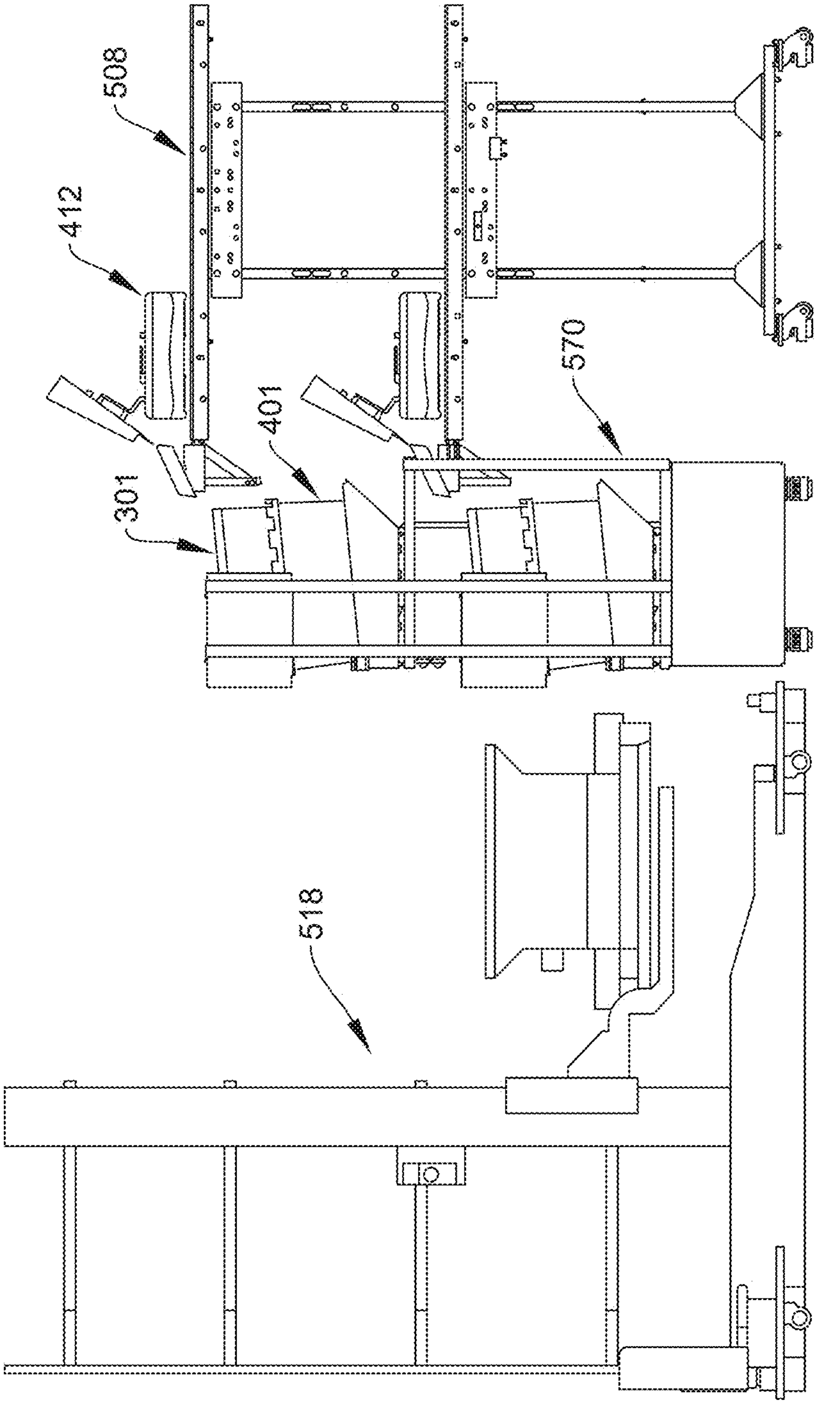
FIG. 5 depicts a side view of a sorting system including sleeved receptacles, a transfer robot and a chamber bank on wheels for use in a sorting operation, according to one or more implementations of the presently disclosed subject matter.
Figure 6:
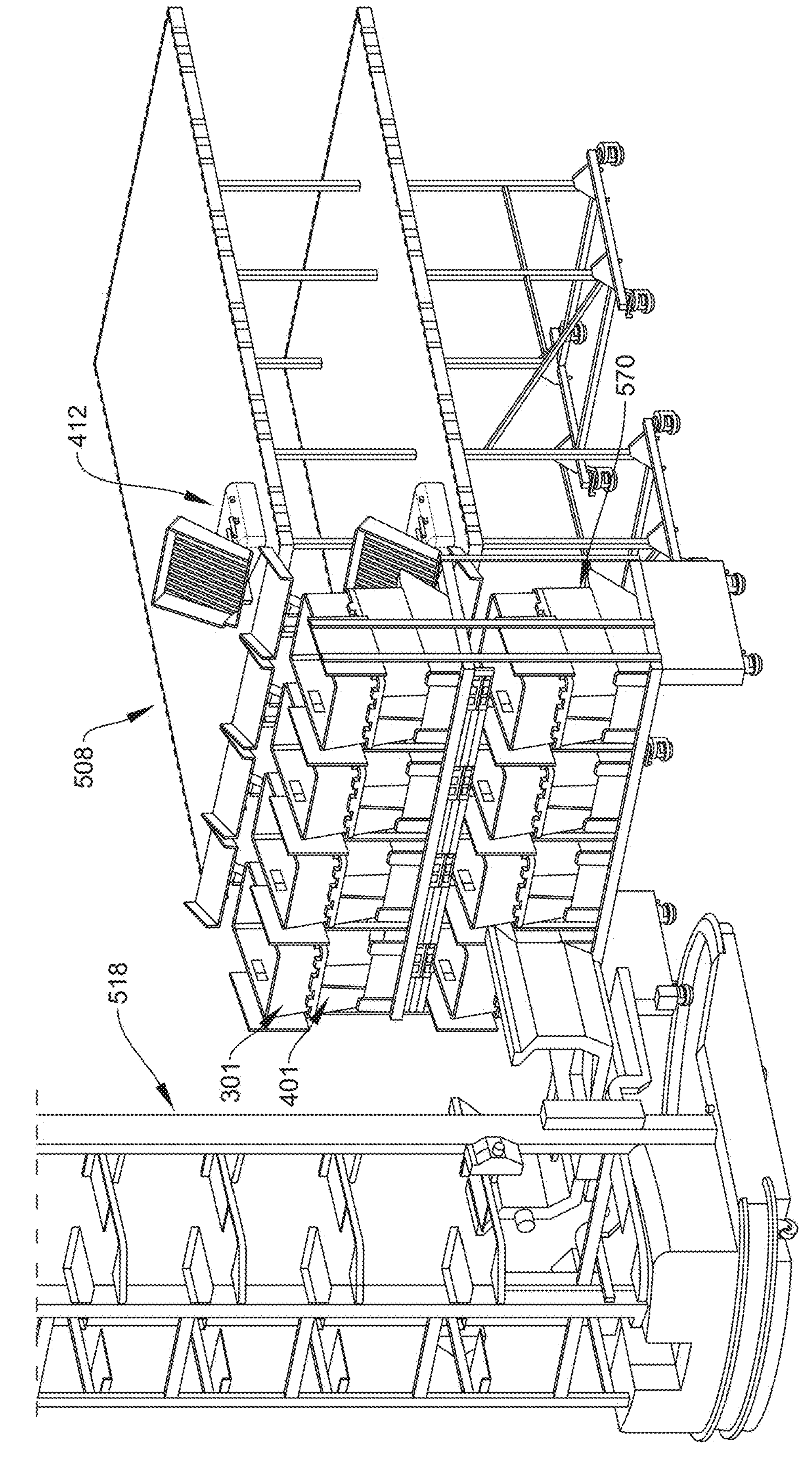
FIG. 6 depicts a side perspective view of a sorting system including sleeved receptacles, robotic vehicles traveling on platforms, a transfer robot, and a chamber bank on wheels—for use in directing a sorting operation, according to one or more implementations of the presently disclosed subject matter.
Figure 7A:
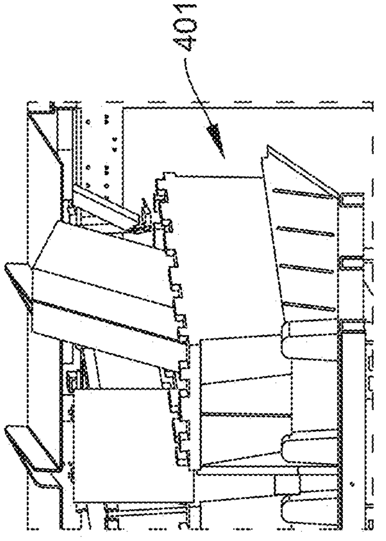
FIGS. 7A-7E depict perspective views of various portions of a chamber bank comprising chambers along with sleeves and totes, according to one or more implementations of the presently disclosed subject matter.
Figure 7B:
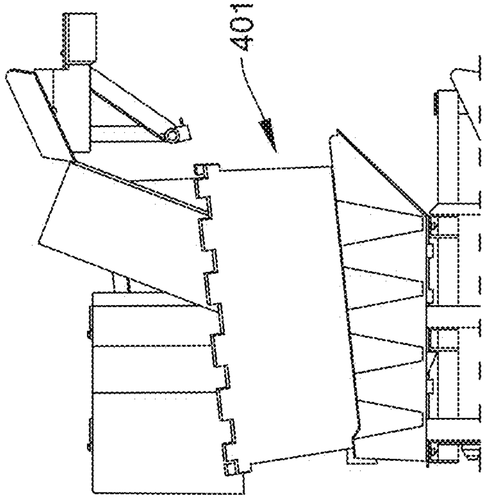
Figure 7C:
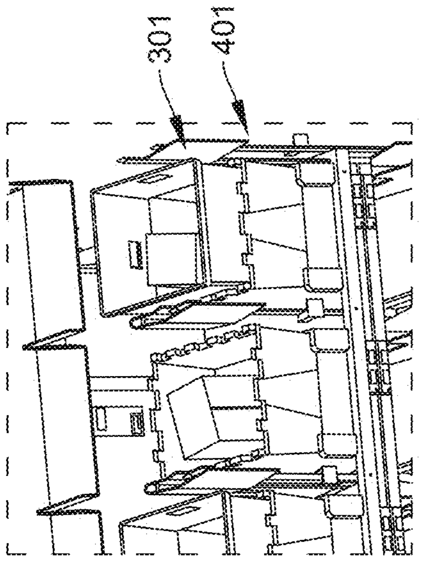
Figure 7D:
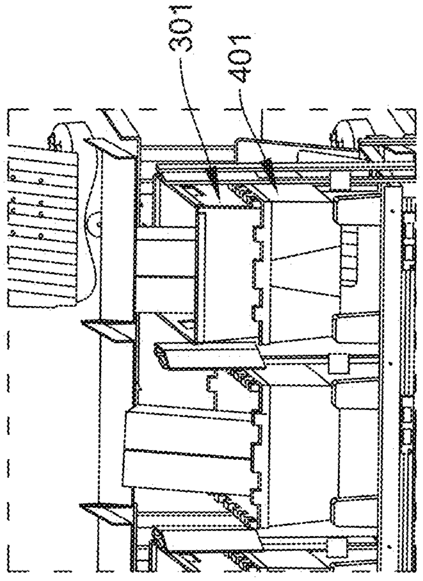
Figure 7E:
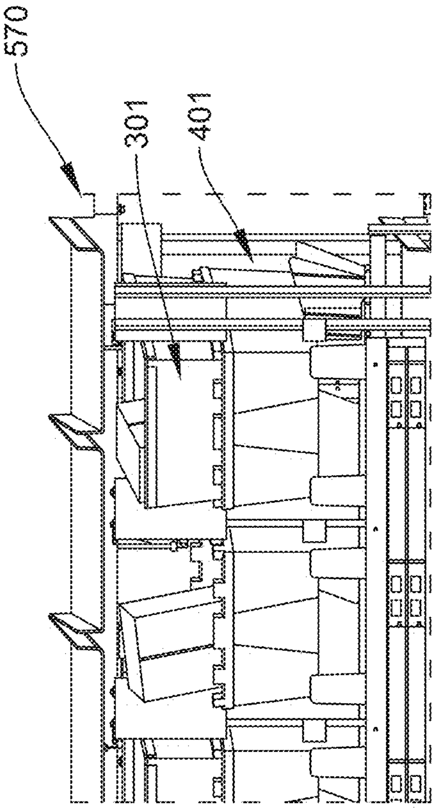
Figure 8B:
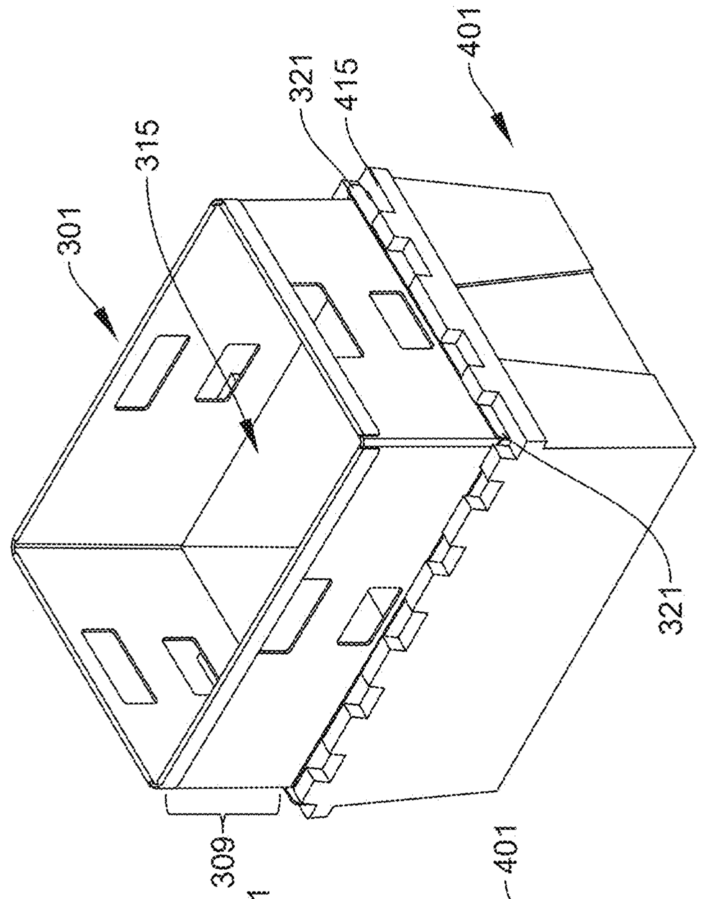
FIGS. 8A and 8B depict perspective views of implementations of a sleeve used with a destination receptacle, according to one or more implementations of the presently disclosed subject matter.
Figure 8A:
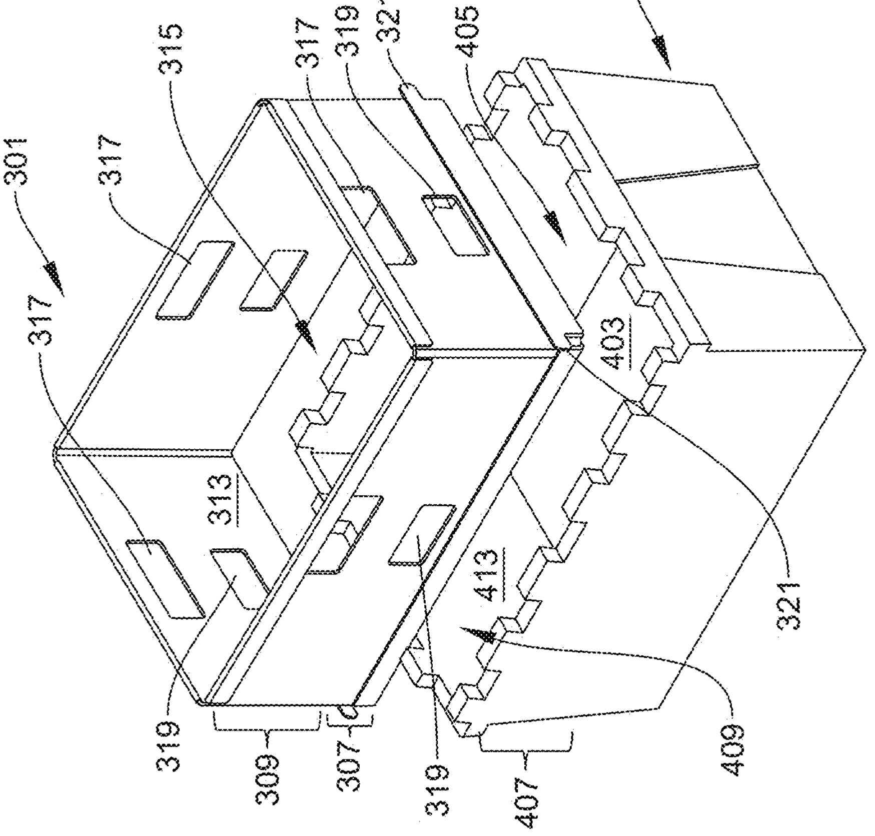
Figure 9B:
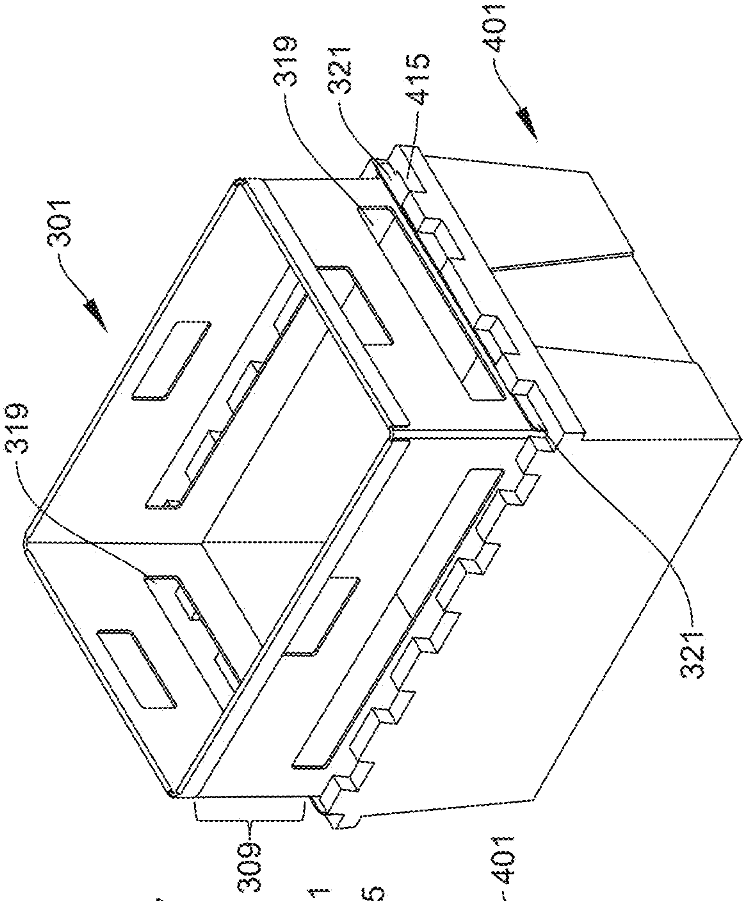
FIGS. 9A and 9B depict perspective views of implementations of a sleeve used with a destination receptacle, according to one or more implementations of the presently disclosed subject matter.
Figure 9A:
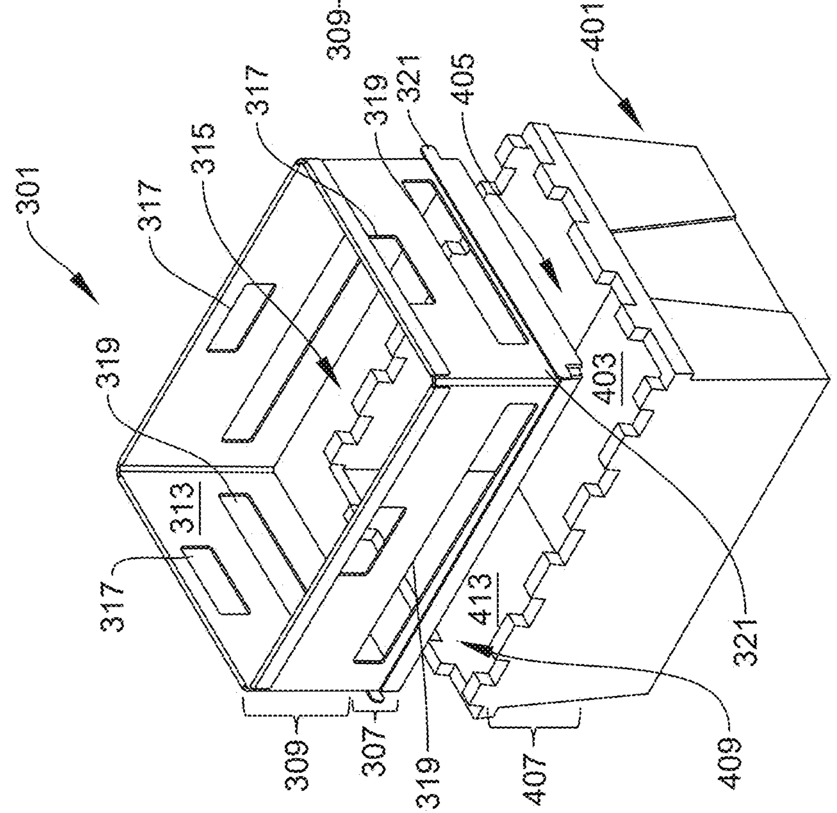
Figure 10B:
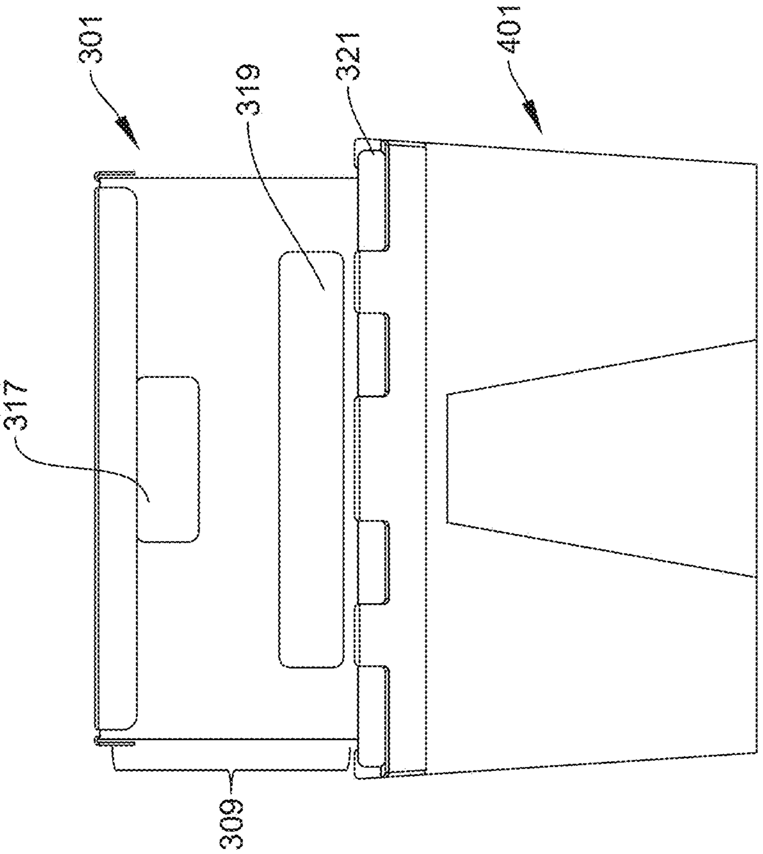
FIG. 10A depicts a perspective view and FIG. 10B depicts a side profile view of implementations of a sleeve used with a destination receptacle, according to one or more implementations of the presently disclosed subject matter.
Figure 10A:
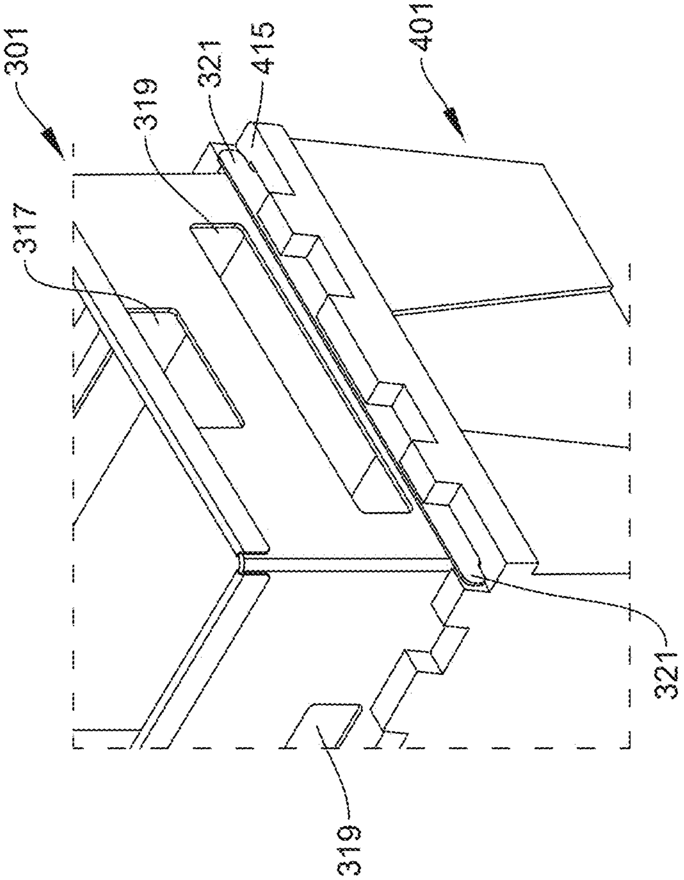
Figure 11A:
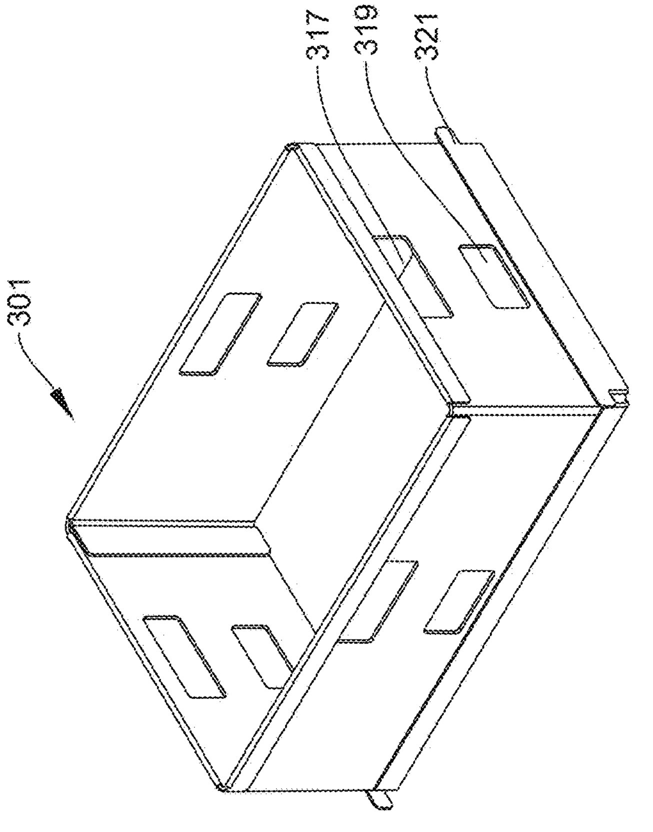
FIG. 11A depicts a perspective view.
Figure 11B:
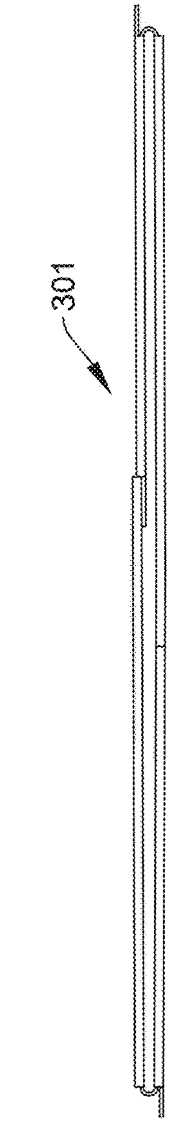
FIG. 11B depicts a side profile view.
Figure 11C:
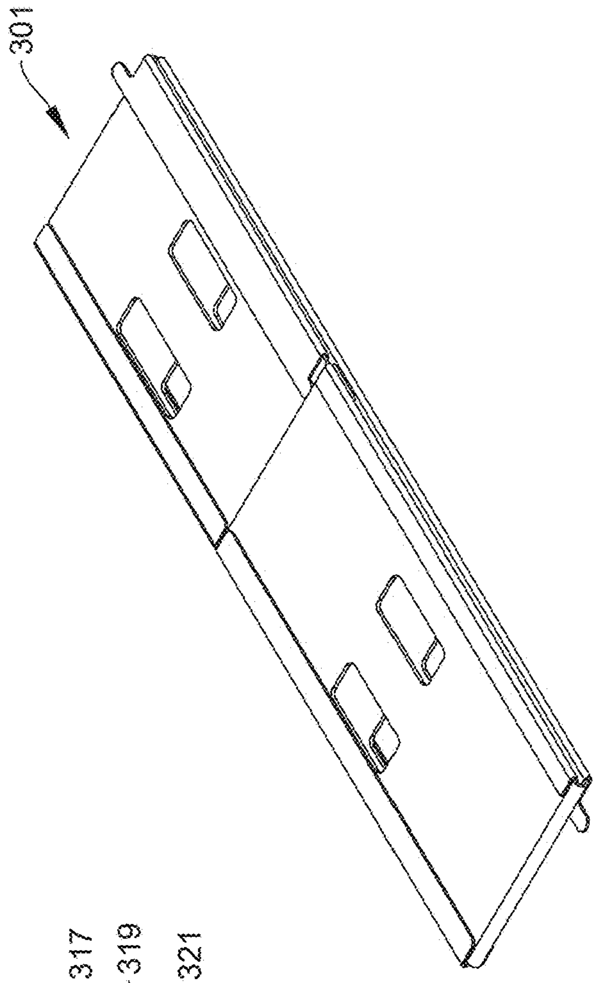
FIG. 11C depicts perspective of implementations of a sleeve for use with a destination receptacle, according to one or more implementations of the presently disclosed subject matter.
Figure 12:
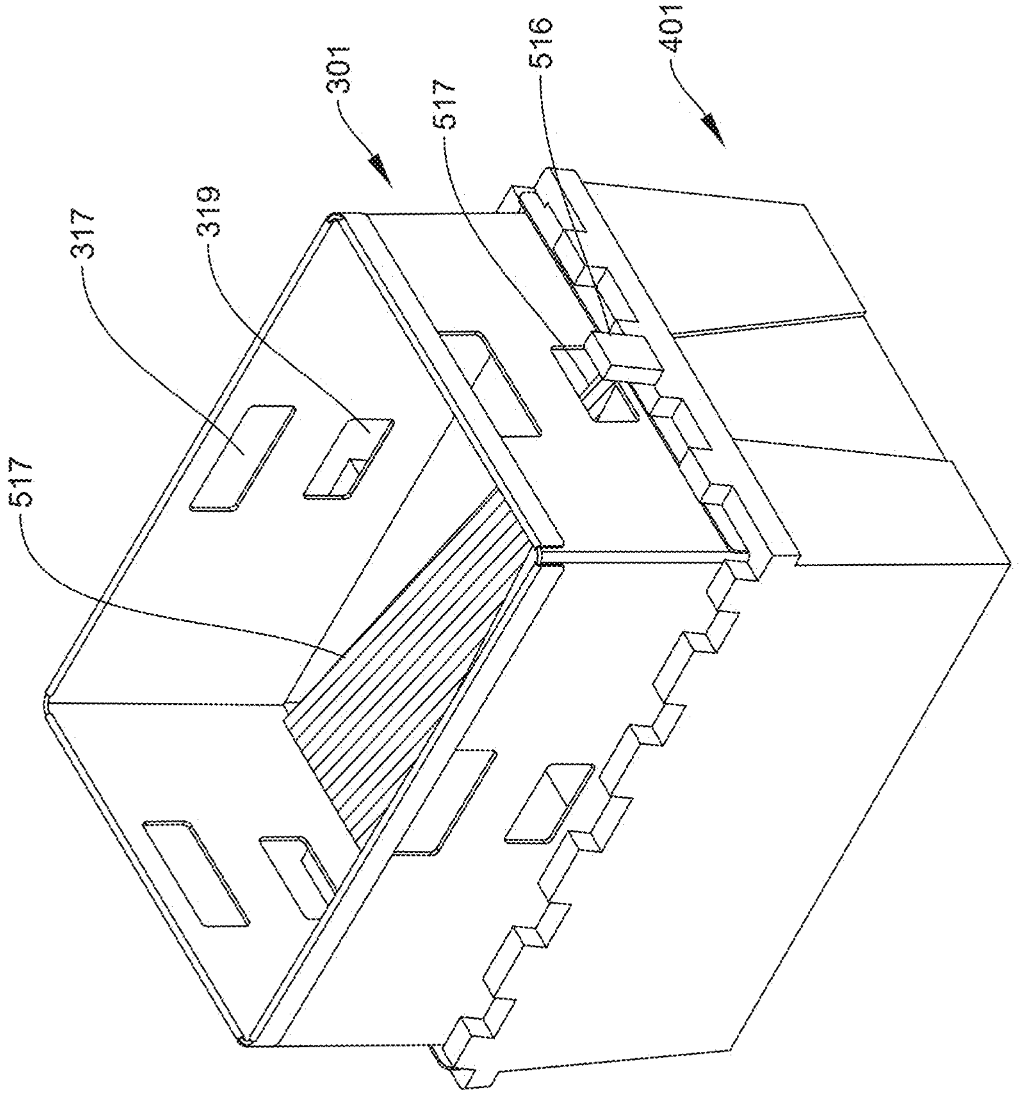
FIG. 12 depicts a perspective view of an implementation of a sleeve used with a destination receptacle, according to one or more implementations of the presently disclosed subject matter.

Embodiments disclosed herein provide for a sleeved receptacle (or tote) system for use in directing a sorting operation such that the filling of a destination receptacle is optimized. FIG. 1 depicts a block diagram of an exemplary sorting system comprising sleeved receptacles or sleeved totes. FIG. 2 depicts a side view of an example implementation of an automated transport device traveling on a platform to transport an article to be sorted to a destination receptacle. FIGS. 3A and 3B depict perspective views of example implementations of a sleeve used with a destination receptacle. FIG. 4 depicts a side view of an exemplary sorting system including sleeved receptacles for use in a sorting operation. FIG. 5 depicts a side view of an exemplary sorting system including sleeved receptacles, a transfer robot and a chamber bank on wheels for use in a sorting operation. FIG. 6 depicts a side perspective view of an exemplary sorting system including sleeved receptacles, robotic vehicles traveling on platforms, a transfer robot, and a chamber bank on wheels—for use in directing a sorting operation. FIGS. 7A-7E depict side and perspective views of various portions of a chamber bank comprising chambers along with sleeves and totes, according to one or more implementations of the presently disclosed subject matter. FIGS. 8A and 8B depict perspective views of a sleeve used with a destination receptacle. FIGS. 9A and 9B depict perspective views of example implementations of a sleeve used with a destination receptacle. FIG. 10A depicts a perspective view and FIG. 10B depicts a side profile view of example implementations of a sleeve used with a destination receptacle. FIG. 11A depicts a perspective view, FIG. 11B depicts a side profile view, and FIG. 11C depicts perspective of example implementations of a sleeve. FIG. 12 depicts a perspective view of an implementation of a sleeve used with a destination receptacle that includes a sensor that is configured to sense: a fill level of the receptacle; that the receptacle has been filled up, or that the empty receptacle is ready to receive articles.

FIG. 1 depicts a block diagram of an improved article sorting system 500 (hereinafter "system 500") for use in directing a sorting operation, according to one or more implementations of the presently disclosed subject matter. According to one embodiment, system 500 comprises a control server such as server 502. Server 502 comprises a memory, a processor; server 502 may further include or may otherwise be in communication with a destination information database 512, and a receptacle assignment engine 422. System 500 further comprises a plurality of receptacles 401 and sleeves 301. Server 502 may optionally further be in communication with receptacles 401 and sleeves 301. Each receptacle 401 is configured for receiving one or more articles 107 (see FIG. 2) that are sorted thereinto.

In at least one embodiment, system 500 for use in directing a sorting operation comprises a server 502 comprising a memory, a processor, and a receptacle assignment engine 422; a plurality of receptacles 401 configured for receiving articles 107 therein, each receptacle 401 defined by a floor 403 and at least one receptacle side wall 413 that together define a receiving space 405 for receiving or accommodating therein one or more articles 107; a sleeve 301 for placement over a top of the receptacle 401 such that a lower sleeve portion 307 of the sleeve contacts or abuts or is otherwise juxtaposed to a receptacle inner surface 409 of the at least one receptacle side wall 413 of the receptacle 401, with an upper sleeve portion 309 of the sleeve 301 extending upward above a top rim 415 of the receptacle 401 and defining a sleeve access opening 315 that permits access to an interior space of the receptacle 401 formed by receptacle side walls 413 of the receptacle 401; and, at least one automated transport device 412 that traverses a platform and deposits articles into the receptacles. In at least one embodiment, system 500 is configured to: assign a first number or count N of articles 107 to a receptacle 401 such that the first count N of articles 107 overfills the specific receptacle 401 when all of the first count N of articles are deposited thereinto whereby, after all of the first count N of articles 107 have been deposited into the receptacle 401, none of the articles 107 fall out of the first receptacle 401 when the receptacle 401 is removed from its location proximal the platform 508 and transported or when the removed receptacle 401 transferred to a location of further processing; and direct an automated transport device 412 to transport and deposit the first count N of articles into the first receptacle 401.

As shown in FIGS. 3A and 3B, in various embodiments, each receptacle 401 is defined by one or more receptacle side walls 413 and a floor 403 that together define a receiving space 405 for receiving therein one or more articles 107. For example, receptacle 401 with a cylindrical shape may have one continuous receptacle side wall 413. System 500 further comprises at least one sleeve 301 for detachably coupling with, attaching to, fitting within, fitting over, or cooperating with, a top region 407 of receptacle 401 such that a lower sleeve portion 307 of the sleeve 301 contacts or abuts or is otherwise juxtaposed to a receptacle inner surface 409 of the at least one receptacle side wall 413 of receptacle 401, with a upper sleeve portion 309 of the sleeve 301 extending upward above a top rim 415 of receptacle 401, with the sleeve 301 thereby defining a sleeve access opening 315 that permits access to the receiving space 405 of the receptacle 401. System 500 further comprises one or more transport devices 412 for transporting and depositing articles 107 into the receptacles 401. Sleeve 301 extending upward above a top rim 415 of receptacle 401 temporarily increases the holding capacity of receptacle 401 such that receptacle 401 could be overfilled with articles 107 without these overfilled articles falling over or outside of receptacle 401.

In various embodiments, sleeve 301 operates to into the receptacle 401 and helps to temporarily extend the sides of receptacle 401 upward and thereby temporarily increases the article holding or article carrying capacity of receptacle 401. The combination of the sleeve 301 and the receptacle 401 in such a set up provides for more volume than what the available volume (for accommodating articles) would have been with just the receptacle 401 without sleeve 301 attached thereto. In various embodiments, sleeve 301 stays coupled to receptacle 401 as the receptacle 401 is being moved from the sorter location to a packing station or a location of further processing, whereby sleeve 301 prevents articles from falling out during the transport or transfer of the overfilled receptacle 401 (by a machine or by a person). In one embodiment, a machine such as, for e.g., a mobile robot, removes a filled up or rather overfilled receptacle 401 and replaces it with an empty receptacle 401. In one embodiment, a machine that removes receptacles and replaces them with empty receptacles may be a crane operable to move vertically and horizontally along a side of the sorter forming part of system 500.

In one embodiment, as shown in FIG. 4, one or more overfilled receptacles 401 may be transported using a chamber bank such as chamber bank 570 provided as part of system 500. Accordingly, in some embodiments, system 500 further comprises one or more chamber banks 570. According to various embodiments, chamber bank 570 comprises one or more chambers 572. Each chamber 572 is configured for receiving a receptacle 401—whether or not the receptacle is fitted with sleeve 301. In one embodiment, as shown in FIG. 4, a transfer robot 518 provided as part of system 500 operates to unload overfilled receptacles 401 carried on chamber bank 570, and transfer robot 518 may further operate to replace the overfilled receptacles 401 with empty receptacles with sleeves attached thereto. Accordingly, in some embodiments, system 500 further comprises one or more transfer robot 518.

In some embodiments, system 500 is configured to assign a first number (or count) N of disparate articles occupying a first volume V to a receptacle 401 such that the first number (or count) N of disparate articles overfills the receptacle 401 when all of the first number N of article are deposited into that receptacle 401. In at least one embodiment, the first number N of articles are all identical to each other or more or less identical to each other, for e.g., due to being of the same SKU (stock keeping unit) number. In at least one embodiment, system 500 is further configured to direct the one or more transport devices 412 traveling on platform 508 to transport and deposit the first count N of articles into receptacle 401 after system 500 or server 502 has ensured that sleeve 301 has been fitted over the top region of the receptacle. In some embodiments, when or after server 502 determines that a first receptacle is full after (or optionally even before) the first count N of disparate articles occupying the first volume V is deposited into and has overfilled a receptacle 401 fitted with sleeve 301 thereon, server 502 directs replacement of the overfilled receptacle 401 fitted with sleeve 301 thereon with a replacement receptacle 401.

In at least one embodiment, after a replacement (i.e., empty) receptacle 401 is properly positioned in an article receiving position proximal a surface such as platform 508 such that it is ready to receive articles 107 to be sorted thereinto, server 502 is configured to receive confirmation of this. In some embodiments, the replacement receptacle 401 arrives proximal platform 508 already fitted with sleeve 301 thereon. In some alternate embodiments, sleeve 301 is fitted onto replacement receptacle 401 only after replacement receptacle 401 is properly positioned in an article receiving position proximal platform 508. Server 502 is accordingly further configured to receive confirmation of the replacement of the overfilled first receptacle 401 with an empty receptacle 401. In the case where the replacement receptacle 401 arrives proximal platform 508 already fitted with sleeve 301 thereon, this information is communicated to server 502, for e.g., by system 500 or by a sensor 516 whereby server 502 determines that the empty receptacle 401 fitted with sleeve 301 thereon is ready to receive articles 107. In the case where the replacement receptacle 401 arrives proximal platform 508 without a sleeve 301 fitted thereon, the server 502 may direct system 500, one of the components of system 500, or a human operator to arrange for the fitting of a sleeve onto the replacement receptacle 401. Further, after receiving confirmation that a sleeve 301 has indeed been fitted onto the replacement receptacle 401, for e.g., via a communication signal received from a component of system 500 or via a communication signal received from sensor 516, server 502 makes a determination that the empty receptacle 401 fitted with sleeve 301 thereon is ready to receive articles 107. In one embodiment, sensor 516 has its own power supply battery whereby it is in wireless communication with system 500. In one embodiment, sensor 516 is hard wired to power supply and is either in wired communication with, or in wireless communication with, system 500.

In at least one embodiment, server 502 is in communication with a sensor 516 configured to sense that the empty receptacle 401 is ready to receive articles 107. In at least one embodiment, system 500 is further configured to verify that there is at least one non-full receptacle 401 available for deposition of articles 107 thereinto, and when this is not the case, server 502 may generate a notification indicating the same for a human operator's attention. In at least one embodiment, when a receptacle 401 fitted with sleeve 301 thereon has become full (i.e., has been overfilled) or otherwise reaches the desired fill level or has received all articles associated with an order that has been assigned to that receptacle, server 502 directs a robot or an automated device such as, for e.g., transfer robot 518, to transport the receptacle 401 fitted with sleeve 301 thereon containing the sorted articles to a location of further processing from its article receiving position that is proximal platform 508. In one embodiment, the location of further processing is a packing station. In some embodiments, the sleeve 301 fitted onto receptacle 401 is removed, for e.g., at the packing station in order to prepare the receptacle 401 for a different type of sorting operation that does not require overfilling of that receptacle s401.

According to one embodiment, after the receptacle 401 reaches the location of further processing, for e.g., a packing station, the first count N of articles are compressed such that a total compressed volume VC of all of first number N of articles is less than or equal to the total volume VR of first receptacle 401. In some embodiments, the first count N of articles is compressed manually, i.e., a human operator, such that the first count N of articles fit into receptacle 401. In some embodiments, system 500 is configured to direct the compression of the first count N of articles by automated means, for e.g., at the packing station, such that the first count N of articles fit properly into and within receptacle 401 whereby receptacle 401 can be sealed or closed. In at least one embodiment, the first number N of articles 107 are compressed such that the total compressed volume VC of all of first number N of articles is less than or equal to the total volume VR of first receptacle 401, i.e., the total compressed volume VC of the first number N of articles, is less than or equal to volume VR of first receptacle 401.

According to at least one embodiment, receptacle assignment engine 422 assigns the first count N of articles having a total volume V to a specific receptacle 401 such that no article falls out of the receptacle 401 with a sleeve 301 fitted thereon when all of the first count N of articles are deposited thereinto, wherein volume V is greater than the volume VR of first receptacle 401. According to at least one embodiment, receptacle assignment engine 422 assigns the first count N of articles having a total volume V such that no article falls out of the receptacle throughout a time period when receptacle 401 with a sleeve 301 fitted thereon is being transported from a first location where the first count of articles is deposited thereinto (i.e., the sorting or sorter location) to a second location of further processing (e.g., a packing location), wherein the volume of receptacle 401 is VR and the combined volume of the combination of sleeve 301 fitted over receptacle 401 is VRS. In one embodiment, the second location comprising a packing station where the articles 107 within receptacle 401 are re-arranged and optionally compressed to maximize space utility and to minimize wasted space, the sleeve 301 is then removed, and receptacle 401 is closed or sealed. In one embodiment, the fitting of sleeve 301 over receptacle 401 provides for an increased or enhanced volume VRS for the combination of sleeve 301 fitted over receptacle 401 wherein the volume VRS may be anywhere between 10% and 400% greater than the volume VR of just the receptacle 401 with no sleeve fitted thereon. According to one embodiment, receptacle assignment engine 422 calculates a volume V of the first count N of articles to be deposited into a receptacle 401. According to one embodiment, the receptacle assignment engine 422 further compares volume V of the first count N of articles to a volume VR of receptacle 401. According to one embodiment, the receptacle assignment engine 422 further compares volume V of the first count N of articles to a volume VRS, the enhanced volume for the combination of sleeve 301 fitted over receptacle 401.

According to one embodiment, sleeve 301 has a total number of sides S that matches a number of side walls T of receptacle 401 into which sleeve 301 is to be fitted. Receptacle 401 can take any shape suitable for the task at hand. For example, the receptacle can have a cross-section along a horizontal plane that is circular, square, rectangle, hexagonal, oval or any other suitable shape, and the sleeve shall have a complimentary shape such that the perimeter of its shape cooperates with the perimeter of the shape of the receptacle. According to one embodiment, receptacle 401 has one of: a circular cross-section with one side wall; a square profile with four side walls; and, a rectangular profile with four side walls, and sleeve 301 shall have a complimentary circular, square or rectangular profile that compliments the profile of receptacle 401.

According to one embodiment, sleeve 301 comprises one or more sleeve openings 319 provided on one or more sleeve side walls 313 operating as receptacle fill level assessment ports through which a fill level of the receptacle 401 can be detected by sensor 516. In at least one embodiment, there is at least one sleeve opening 319 defined on one sleeve side wall 313 of sleeve 301 through which a beam from a photo eye or a light curtain can travel therethrough to sense when the receptacle is full. In one embodiment, only the short sleeve side wall 313 includes a sleeve opening 319. In one embodiment, only the long sleeve side wall 313 includes a sleeve opening 319. In one embodiment, both the long sleeve side wall 313 as well as the short sleeve side wall include sleeve openings 319. In one embodiment, each sleeve 301 has a total of only one sleeve opening 319. In some embodiments, sleeve opening 319 is positioned below sleeve openings 319; in other alternate embodiments, sleeve opening 319 is positioned above sleeve openings 319. In at least one embodiment, there is an opening extending up to 85% of the length of the side wall of the sleeve through which a beam from a light curtain can travel through to sense the level to which a receptacle is filled up or to sense when the receptacle is full.

In at least one embodiment, sensor 516 comprises one or more of: an infra-red sensor, an ultrasonic sensor, a visible light sensor, and a LIDAR (Light Detection and Ranging) sensor. In at least one embodiment, the fill level of receptacle 401 is detected by one or more of: a photo eye sensor, a light curtain sensor, an infra-red sensor, an ultrasonic sensor, a visible light sensor, and a LIDAR (Light Detection and Ranging) sensor. In various embodiments, server 502 is in communication with sensor 516 configured to sense if and when a receptacle 401 fitted with sleeve 301 thereon is full or is about to become full, e.g., 90%, 95% or 99% full.

Sleeve opening 319 provided on a sleeve side wall 313 serves as hole in the sleeve 301 through which sensor 516 can sense a fill level of receptacle 401 therethrough. In one embodiment, sleeve opening 319 is positioned such that is located at a predetermined height above the top rim of receptacle 401 to allow for the overfilling of receptacle 401, but not so high that such positioning of sleeve opening 319 results in articles 107 deposited into receptacle 401 starting to fall out of sleeve opening 319 either during the deposition process or during the transferring of receptacle 401 to the location of further processing. In one embodiment, system 500 operates to ensure that the center of gravity of long or tall articles 107 remains below the top edge of sleeve 301 to minimize or prevent such articles 107 falling out of receptacle 401. In at least one embodiment, a receptacle opening (not shown) that complements sleeve opening 319 is provided on receptacle 401 for sensor 516 to sense therethrough whereby the sensing signal 517 passes through the receptacle opening and the sleeve opening 319 that is optically aligned with such receptacle opening to detect a fill level of the receptacle 401. Sensing signal 517 can be any electromagnetic signal within the electromagnetic spectrum including infra-red, ultraviolet, invisible light, etc.

In one embodiment, sensor 516 is configured to sense if and when a receptacle 401 fitted thereon with sleeve 301 is overfilled to a predetermined level, such predetermined level being determined by system 500. In one embodiment, server 502 is in communication with sensor 516, wherein sensor 516 is configured to sense if and when a receptacle 401 fitted thereon with sleeve 301 is full or is about to become full. In one embodiment, sensor 516 is in the form of a light curtain set-up, wherein sensor 516 includes an emitter pylon and a receiver pylon. Sensor 516 operates to sense that a receptacle has become full or is about to become full through sleeve opening 319. In various embodiments, sensor 516 is in two-way communication with server 502. In one embodiment, sensor 516 in the form of an optical sensor such as, for e.g., a photo eye. Sensor 516 in the form of an optical sensor includes a field of vision that determines through sleeve opening 319 a fill level of receptacle 401 with a sleeve 301 fitted thereon. In one embodiment, sleeve further comprises a slot for receiving therein a sensor similar to sensor 516 that detects a fill level of the receptacle 401. Accordingly, in one embodiment, sensor 516, through sleeve opening 319, determines that a destination receptacle such as receptacle 401 with a sleeve 301 fitted thereon has become full. In one embodiment, server 502 is in communication with sensor 516 configured to sense if and when a receptacle 401 fitted with sleeve 301 thereon is full or almost full. In one embodiment, sensor 516 in the form of a light curtain set-up. Sensor 516 operates to sense that a receptacle has become full through sleeve access opening 315. In one embodiment, when the field of vision indicates that the receptacle 401 with a sleeve 301 fitted thereon is 75%, 80%, 85%, 90%, 95% or 99% full, server 502 is in communication with sensor 516 senses that receptacle 401 with a sleeve 301 fitted thereon is about to become full. In one embodiment, when the field of vision indicates that the volume of articles 107 sorted into receptacle 401 with a sleeve 301 fitted thereon is 75%, 80%, 85%, 90%, 95% or 99% of the volume VRS of the combination of sleeve 301 fitted over receptacle 401, server 502 is in communication with sensor 516 senses that receptacle 401 with a sleeve 301 fitted thereon is about to become full.

In some embodiments, sleeve 301 comprises at least one pair of sleeve handling openings 317 for lifting the sleeve-one on each opposing sleeve side wall 313. In some embodiments, sleeve comprises at least one sleeve handling opening 317 provided on each sleeve side wall 313 for lifting or handling of the sleeve. In some embodiments, sleeve comprises two pairs of sleeve handling opening 317. In various embodiments, sleeve comprises at least one sleeve handling opening 317 on each long sleeve side wall 313 for lifting or handling of the sleeve 301. In various embodiments, sleeve 301 may include one or more sleeve handling openings 317 as well as one or more one sleeve opening 319. In at least one embodiment, sleeve 301 may include one sleeve handling opening 317 and one sleeve opening 319 provided on each sleeve side wall 313 of sleeve 301; sleeve handling openings 317 act as additional openings provided on a sleeve side wall 313 of sleeve 301 to serve as handles.

In at least one embodiment, sensor 516, through sleeve handling opening 317 (instead of sleeve opening 319) determines that a destination receptacle such as receptacle 401 with a sleeve 301 fitted thereon has become full or almost full, for e.g., the total volume of articles thereinto has reached 90%, 95% or 99% of the volume VRS of the combination of sleeve 301 fitted over receptacle 401. In other words, whereas sleeve handling opening 317 primarily operates to serve the primary function of handling of the sleeve by a person or a machine, for e.g., to lift or place sleeve 301, sleeve handling opening 317 may further serve a secondary function of allowing signals from sensor 516 therethrough, these signals operating to determine a fill level of receptacle 401 with a sleeve 301 fitted thereon.

In at least one embodiment, a sleeve handling opening 317 may double as, and serves the same function as, sleeve opening 319; in other words, such an embodiment may only include a sleeve handling opening 317 but no one sleeve opening 319.

In some embodiments, as illustrated, for e.g., in FIGS. 11A-AC, sleeve 301 may be collapsible such that prior to use of sleeve 301 or when sleeve 301 is not in use, sleeve 301 can be flattened out as shown in FIGS. 11B and 11C such that sleeve 301 in its collapsed configuration occupies minimal space or at least less space as compared to its regular, extended or un-collapsed configuration. In one embodiment, as illustrated in FIGS. 11B and 11C, sleeve 301 is configured for storing in a collapsed disposition till such time there is need to fit a sleeve 301 onto a receptacle 401, for e.g., similar to how a new and empty moving cardboard box is presented in a collapsed disposition when purchased at a hardware store. Further, similar to how a new and empty moving cardboard box is converted into a loading disposition in order to get it ready to receive articles therein, a sleeve 301 in a collapsed disposition as shown, for e.g., in FIGS. 11B and 11C, is converted into a loading or use disposition as shown, for e.g., in FIG. 11A, to create or otherwise expose sleeve access opening 315 following which the sleeve 301 is fitted onto receptacle 401 as shown, for e.g., in FIG. 3B.

In one embodiment, sleeve 301 may—in addition to or in lieu of being collapsible—also be foldable. In such an embodiment, sleeve 301 shall include one or more creases provided along or over a length of a sleeve side wall 313 to facilitate folding of sleeve 301 when not in use. In such an embodiment, sleeve 301 shall include one or more creases provided along or over a breadth sleeve side wall 313 to facilitate folding of sleeve 301 when not in use. In one embodiment, sleeve 301 shall include one or more creases provided along a length sleeve side wall 313 and also along its breadth to facilitate folding of sleeve 301 when not in use. In an embodiment having creases, a sleeve side wall 313 having one or more creases can be folded at each of such creases to thereby reduce the area AS or volume VS occupied by such folded sleeve 301 in its folded configuration. Further, similar to how a new and empty moving cardboard box is converted into a loading disposition in order to get it ready to receive articles therein, a sleeve 301 in a folded disposition is unfolded into a loading or use disposition as shown, for e.g., in FIG. 11A, to create or otherwise expose sleeve access opening 315 following which the sleeve 301 is fitted onto receptacle 401.

According to one embodiment, a sleeve system for use in a sorting operation (such as, for e.g., system 500) comprises one or more receptacles 401. Receptacle 401 is defined by a floor 403 and at least one receptacle side wall 413 that together define a receiving space for one or more articles deposited thereinto by an automated transport device 412. The sleeve system further comprises sleeve 301 removably attached to receptacle 401 such that lower sleeve portion 307 of sleeve 301 contacts a receptacle inner surface 409 of the at least one receptacle side wall 413 of receptacle 401. An upper sleeve portion 309 of sleeve 301 extends upward above a top rim 415 of the receptacle 401 and the sleeve 301 thereby defines a sleeve access opening 315 that permits access to the receiving space 405 of the receptacle 401.

The sleeve system further comprises a ledge 321 provided on sleeve 301 that rests on the top rim 415 of receptacle 401, wherein ledge 321 operates to prevent sleeve 301 from sliding into or otherwise falling within or into receptacle 401 after sleeve 301 is placed on top of, or otherwise fitted onto or coupled with, receptacle 401. In at least one embodiment, ledge 321 extends around the whole outer circumference of sleeve 301. In at least one embodiment, ledge 321 comprises two ledges 321 provided on opposite sides of sleeve 301. In at least one embodiment, ledge 321 comprises at least one ledge provided on each sleeve side wall 313 of sleeve 301. In at least one embodiment, as shown, for e.g., in FIG. 8A, sleeve 301 further comprises at least one or more pairs of ledges 321 that rest on the top rim 415 of the receptacle 401 to thereby prevent the sleeve 301 from falling into or sliding completely into receptacle 401. In one embodiment, these ledges 321 are positioned on opposing sleeve side walls 313 of sleeve 301. In some embodiments, several ledges 321 of limited width (e.g., between 0.1-inch and 1-inch each) are provided on each sleeve side wall 313. In some embodiments, one or more ledges 321 of limited width (e.g., between 0.1-inch and 1-inch each) are provided on each sleeve side wall 313. In some embodiments, ledge 321 may take the form as shown, for e.g., in FIG. 8A. such that ledge 321 extends outwardly from each of the corners of sleeve 301 such that the ledges 321 (four ledges in the FIG. 8A embodiment) operate to prevent sleeve 301 from falling into or sliding completely into receptacle 401. In some embodiments, each ledge 321 may extend outwardly for a length of between 0.1 inches and 3 inches from sleeve side wall 313 of sleeve 301.

Embodiments of the presently disclosed subject matter operate to advantageously overcome the limitations of the art by providing for apparatus, systems and methods to sort articles to receptacles in that reduces or eliminates the occurrence of prematurely transferring a receptacle to a packing season before receptacle is actually filled up. Embodiments disclosed herein provide for a sleeve 301 that fits into the receptacle 401 and helps to temporarily extend the sides of receptacle 401 upward with the combination of the sleeve 301 and the receptacle 401 in such a set up provides for more volume than just the receptacle 401. In various embodiments, sleeve 301 stays with receptacle 401 as receptacle 401 is moved from the sorter to the packing station, whereby sleeve 301 prevents articles from falling out during transport of the overfilled receptacle 401 by a machine or by a person.

According to at least one embodiment, system 500 is configured to assign a first number N of articles 107 that occupy a first volume V to a first receptacle 401 fitted with a sleeve 301 among a plurality of receptacles 401 such that the first number N of articles overfills the first receptacle 401 when all of the first number N of articles are deposited thereinto; in at least one embodiment, the "ungroomed" volume of the first number N of articles 107 exceeds the first volume VR of a first receptacle 401. System 500 is further configured to direct transport device 412 to transport and deposit the first number N of articles 107 into the first receptacle 401. According to various embodiments, the first volume V occupied by the first number N of articles shall be equal to between 1% and 400% of the volume VR of first receptacle 401 such that the first number N of articles overfills the first receptacle 401 prior to the first number of articles being "groomed" by the application of pressure to compress the first of articles such that they fit with the volume VR of first receptacle 401; after one or more such groomings, the first receptacle 401 can be closed and/or otherwise sealed so that it can be transported or shipped to its destination such as a store address or a customer address. In an alternate embodiment, after one or more such groomings, the first receptacle 401 is transported to a location of further processing where it is closed and/or otherwise sealed. In a further embodiment, the first receptacle 401 is transported to a location of further processing where it is groomed, and then closed and/or otherwise sealed. In at least one embodiment, the first number N of articles 107 are compressed such that the total compressed volume VC of all of first number N of articles is less than or equal to the total volume VR of first receptacle 401.

In one embodiment, sensor 516 detects a fill level or an overfill level of first receptacle 401 fitted with sleeve 301. In various embodiments, sensor 516 is in wired or wireless communication with one or more secondary sensing devices. Each of sensor 516 and secondary sensing device is configured to sense the filling level or an overfilling level of a receptacle 401 fitted with sleeve 301, for e.g., to sense whether a receptacle 401 is empty, underfilled, filled, or overfilled. In at least one embodiment, after system 500 identifies that a specific receptacle 401 has been filled or has been overfilled as determined by one or more of sensor 516 and secondary sensing device, and system 500 determines that no more grooming of articles within the specific receptacle 401 is required or needed, server 502 directs a person, a robot, or an automated device such as, for e.g., transfer robot 518, to transport full receptacle 401 optionally fitted with sleeve 301 from its article receiving position that is proximal platform 508 to a location of further processing. In some embodiments, the full receptacle 401 is removed manually.

According to at least one embodiment, the first number of articles N are compressed manually by a manual operator such that all of the first number N of articles fit into first receptacle 401. According to at least one alternate embodiment, the first number N of articles 107 are compressed by automated means to arrive at the total compressed volume VC of all of first number N of articles such that the first number of articles can fit into the first receptacle 401 after which first receptacle 401 can be closed and/or otherwise sealed with all of the first number N of articles present therein; in such an embodiment, a robotic arm or some other automated compressing mechanism compresses the overfilled articles into first receptacle 401 to arrive at the total compressed volume VC of all of first number N of articles after which first receptacle 401 can be closed and/or otherwise sealed with all of the first number N of articles present therein.

According to various embodiments, system 500 is further configured to transmit information indicating that the first receptacle 401 is ready to be compressed, at which point the first receptacle 401 can be compressed either manually or by automated means. According to various embodiments, system 500 is optionally further configured to transmit information indicating that the first receptacle 401 is ready to be compressed for a second time; in such an embodiment, there may be more than one instance of compression the articles deposited into the first receptacle 401.

In some embodiments, the first receptacle 401 may be compressed on 2, 3, 4 or more occasions based on the needs of the application at hand. According to various embodiments, system 500 is further configured to transmit the information indicating that the first receptacle 401 is ready to be compressed in such a manner that it can be received at a hand-held computing device or smart device. According to various embodiments, system 500 or receptacle assignment engine 422 is further configured to calculate or estimate an uncompressed volume V and a compressed volume VC of the first number of articles to be deposited into the first receptacle 401. In one embodiment, receptacle assignment engine 422 is further configured to identify, store or receive a volume VR of first receptacle 401; in one example receptacle assignment engine 422 receives information regarding the total volume VR of the first receptacle 401 from server 502. In one embodiment, receptacle assignment engine 422 is further configured to identify, store or receive a volume VRS of the combination of sleeve 301 fitted onto receptacle 401.

In various embodiments, system 500 comprises an article information acquisition device 506 electronically coupled to server 502. Article information acquisition device 506 is configured to determine a product type of each article 107 by interacting with each article 107. In various embodiments, server 502 is further configured to calculate or receive and store information such as one or more of: first volume V of a first number N of articles deposited into first receptacle 401, volume VR of first receptacle 401, and a total compressed volume VC of the first number of articles. In various embodiments, server 502 is further configured to calculate one or more of: a total number N of articles delivered to or deposited at the first receptacle 401 by transport device 412, and a total volume V of articles delivered to or deposited at the first receptacle 401 by transport device 412. Server 502 can have access to information regarding the total volume VR of the first receptacle 401 whereby server 502 can determine, calculate, or estimate the time instant when the first receptacle fitted with a sleeve is full or is about to get full.

In various embodiments, transport devices 412 may traverse a surface, floor area, or a platform such as platform 508 to deposit articles into receptacles. In at least one embodiment, system 500 is configured to assign a second number of articles to a second receptacle 401. In at least one embodiment, system 500 is configured to re-assign some of the articles previously assigned to the first receptacle 401 to a second receptacle 401. In various embodiments, system 500 can further operate to coordinate the replacement of a full receptacle 401 with a replacement receptacle 401.

System 500 comprises, or is in communication with, a destination information database 512 and with server 502 of system 500. System 500 is configured to use data available at destination information database. In some embodiments, based on the data available at destination information database, server 502 is further configured to optimize the total distance that needs to be traveled by one or more transport devices to fill a particular receptacle such that the total distance traveled by all transport devices 412 to fill that receptacle is minimized whenever possible. For example, in one implementation, a destination that is expected to receive the greatest number of articles therein is assigned to one or more receptacles that are located closest to an article induction point; this advantageously ensures that the multiple trips needed to fill a particular high demand destination involve the shortest travel durations or the shortest (one-way or two-way) travel distances.

In various embodiments, transport device 412 can comprise an automated mobile robot (AMR), a computer-controlled vehicle, a track-arranged device, an overhead transport device, a pedestal robot, a personal AMR, a pick assist AMR, an automated conveyor system, or any similar automated transport or transfer device. In at least one embodiment, transport device 412 traverses a first surface, floor area, platform, or a track arrangement. In some embodiments, transport device 412 may comprise a conveyor. FIG. 2 depicts an example automated transport device such as transport device 412 traveling on platform 508 for carrying, moving, or transporting an article such as first article 107 to be sorted to a receptacle.

In one implementation, system 500 carries out sortation operations using transport devices 412 in the form of autonomous mobile robots (AMRs). In this implementation, a given AMR has been routed to a receptacle and the system recognizes that the receptacle is full or that the receptacle has been overfilled. AMRs which are enroute to a destination receptacle which is determined to be filled up or to have been overfilled after an AMR has been dispatched by the system to deliver an article to closes, the AMR is re-routed to the new receptacle. The event of a destination receptacle being filled up or being overfilled can be determined by sensor 516 at the location that communicates this information to server 502, or by server 502 that calculates the total cubic volume or total weight of all of the articles sorted into that destination receptacle. Server 502 re-routes any enroute vehicles from the filled or overfilled receptacle location to a new receptacle's physical location. Any subsequent articles destined for the filled or overfilled receptacle destination are routed to the new receptacle's physical location. Server 502 initiates or directs the change-out or grooming of the filled or overfilled receptacle or the changeout of the chamber bank containing the filled or overfilled receptacle. This initiation may be in the form of a message to another system that controls the change-out robots, or in the form of an indication to a human operator via lights, sounds, signals sent to a handheld computer, etc. When the change-out or grooming is complete, the change-out or grooming automation mechanism or human operator may send a confirmatory message to the server indicating that the location is available for another or the same assignment.

System 500 may further include an input article region that functions to hold articles prior to sorting. In one variation, the input article region includes one or more input article holders that contain unsorted articles. The article holders can be placed adjacent to article information acquisition device 506 and are preferably within the reachable range of article information acquisition device 506. In this way, a worker, conveyor system, or a robotic system may move an article holder into position and optionally remove empty (or otherwise finished) article holders present at input article region. Articles and/or article holders may be moved through or added to the input article region using a conveyor, a chute, an autonomous mobile robot, or using any suitable mechanism. In one embodiment, one or more articles may be supplied such that an article identifier (or property) is already known to system 500 when article information acquisition device 506 interacts with the article whereby a receptacle 401 may be associated with the article prior to placement of the article on a transport device 412. In one embodiment, the order of article selection by system 500 may factor in the capacity levels of receptacles such that an article is dispatched after server 502 determines that an associated receptacle 401 has capacity to receive the article.

Article information acquisition device 506 may include one or more sensors configured for article identification. This could include a sensor for scanning a barcode and/or an RFID tag reader. In one exemplary implementation, system 500 may include 4 barcode scanners: two side scanners, one top scanner, and a bottom scanner. The two side barcode scanners can capture barcodes on the sides of articles while rotating the article. The top scanner can capture barcodes from up top such as after article placement in a transfer tray or the article tray. The bottom scanner can capture barcodes from below as the article is removed from the article receptacle. A transparent shield can be placed above the bottom scanner so that if an article is dropped it will deflect off the shield. Any suitable sensing system may be used for collecting information of an article that can be used to determine a destination output receptacle.

Article information acquisition device 506 may further function to collect data of the objects and the environment. In one embodiment, article information acquisition device 506 includes an imaging system, which functions to collect image data. The imaging system can include at least one imaging device with a field of view of a region of interest that covers a region where the article is transferred to a transport device 412 and the input article region. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used. Article information acquisition device 506 may collect data that is communicated to the server 502 to facilitate article placement onto a transport device. For example, image data of a collection of articles in the input article region can be processed by an analysis model that outputs one or more sortation plans (e.g., points for article selection, or motion plans for approaching, and picking up an article).

Article information acquisition device 506 may additionally or alternatively include one or more sensors for article dimensioning. Article information acquisition device 506 could include one or more dimensional camera (e.g., a depth sensor) or similar other sensor system for dimensioning the article. Dimensioning can include determining spatial characteristics of the article (i.e., article dimensions). In one implementation the article dimensions can include defining a bounding volume of the article (e.g., a width, height, and depth of the article). The article dimensions may be used at least in part in planning placement orientation during induction and sortation into a receptacle 401. Other sensors such as load cells, proximity sensors, RFID tracking systems, and the like may also be used to monitor status of various aspects of system 500. System 500 may additionally include other supplementary systems such as, for e.g., label printer and applicator, which function to enable labels to be produced and applied to an article prior to sortation.

System 500 may additionally include a receptacle capacity sensor that functions to measure the capacity level of an article receptacle and/or to detect when an article receptacle is at proximity. In one embodiment, one or more of sensor 516 and secondary sensing device may perform this function. A variety of sensing technologies may be used for these purposes. In one implementation, a depth sensor or an imaging system can be downwardly attached to a surface such as platform 508. The depth sensor can detect or collect image data used in predicting the capacity level of an article receptacle as it passes over the article receptacles. The capacity of an article receptacle may be measured each time an article is deposited into it. The receptacle capacity sensor is in one- or two-way communication with server 502. In one variation, the output receptacle capacity sensor is coupled to platform 508 or to transport device 412 such that the output receptacle capacity sensor can be moved across an array of receptacles 401. The capacity of a receptacle 401 may be measured as the capacity sensor passes over a receptacle during use of the transport device 412 such as when in transit and/or while depositing an article. Further, platform 508 may be equipped with sensors or other elements that can act on an article being sorted. In particular, platform 508 could include a weight sensor so that articles could be weighed prior to being transferred to a transport device. In one example, the weight sensor could be a load cell (or other sort of pressure sensor, strain sensor, digital scale, or the like to estimate/measure weight) integrated into a transfer tray.

In one implementation, article information acquisition device 506 interacting with the article can include determining an identifier of the article. This may be used when information concerning the identity of the article is unknown prior to picking the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

After determining the identifier of the article, the system may determine a targeted article receptacle of the article based on the identifier of the article. In other words, an article can be picked and scanned to determine its identity, and then based on the identity query a database to determine which one or more targeted article receptacle to associate with the article. The system can then facilitate sorting the article into the targeted article receptacle such as receptacle 401.

According to at least one embodiment, server 502 operates to manage the sort destinations using at least 3 main parameters or fields: receptacles, physical locations, and logical destinations. In various embodiments, the destination associated with a receptacle 401 may represent: an order, a store, a shipping route, carrier, zip code, city, and a similar other characteristic. In at least one embodiment, there are multiple receptacles associated with one destination ID, e.g., when a store order requires more than will fit in one receptacle. Accordingly, in at least one embodiment, server 502 uses physical locations (rather than receptacles) to sort articles and to direct transport device 412 for sorting articles into receptacles.

In one embodiment, processing of the article to be sorted before placement on a transport device can include determining dimensional properties of the article, which functions to sense or detect one or more dimensions of the article. In one embodiment, determining dimensional properties of the article can include determining a bounding volume of the article (e.g., height, width, and depth). In another embodiment, determining dimensional properties of the article may include collecting a full or partial 3D scan of the surface of the article. Determining dimensional properties can include sensing one or more dimensional metrics of the article. This may involve moving the article in range of a dimensional camera or other sensing system. This may additionally include manipulating the article within the view of a sensor for scanning different views of the article. In addition to sensing dimensions, image data may be used to predict dimensions and/or form of the object using an AI (artificial intelligence) classifier model or other technique.

The dimensional properties may be used for any suitable purpose, but in one particular embodiment, the dimensional properties may be used in predicting a placement orientation of the article for depositing into an article receptacle. In other words, the dimensions and/or shape of the article can be used for figuring out how the article may be best placed in an article tray of an article sortation unit so that when it deposits the article into an article receptacle it has high confidence for successful depositing. This can avoid situations where articles of more irregular forms could flip over and miss an article receptacle. In one embodiment, the dimensional properties of the article can be used in determining if an article is larger in one or more axes than the container opening and then orienting the article such that when deposited the object enters an article receptacle with a side with dimensions that do fit within a defined opening of the article receptacle.

Herein, reference made to "articles" characterizes the objects subjected to sortation by a sorting system. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as receptacle 401, which is used to characterize the receptacle used to hold articles once sorted. The form factor and variety of the receptacles can vary greatly, and the system may be adapted to different types of receptacles such as boxes, receptacles, trays, bags, gaylords, and the like. Article receptacles may use any suitable form factor and, in some cases, may use the same type of container. In some variations, the form factor may be customized for particular variations and implementations of system 500 as described herein.

In some implementations, one or more components such as receptacle assignment engine 422 and destination information database 512 may reside external to server 502 but nonetheless in communication with server 502. System 500 further comprises or is in communication with sensors 516, transport devices 412, and one or more receptacles 401. System 500 includes additional components such as article information acquisition device 506 (e.g., a scanner, image capturing equipment, or similar other equipment), and a wireless access point 514, among others. System 500 further includes one or more receptacles 401, sleeves 301 fitted onto or configured for fitting onto receptacles 401, wherein system 500 operates to sort a plurality of articles to a receptacle 401 pre-fitted with a sleeve 301, the plurality of articles comprising a first article 107.

In various embodiments, server 502 is a control server that is configured for communicating with one or more components of system 500 as described herein, and as shown, for example, in FIG. 1. In one implementation, server 502 includes memory, a processor, and/or one or more communication interfaces communicatively coupled to each other. A network may form part of system 500, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, transport devices 412 that are computer-controlled or automated, and server 502 may communicate over the network with the cloud. In some implementations, one or more components of system 500 may reside in the cloud. For example, in one implementation, server 502 may reside in the cloud. In at least one implementation, server 502 may be in communication with one or more third-party servers, such as warehouse management system servers and automated transport device operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Each of the components of system 500 may be in communication with one or more other components through a wired and/or a wireless network. For example, the cloud, the server 502 may further communicate with receptacles 401, sleeves 301, receptacle assignment engine 422, sensors 516, article information acquisition devices 506, automated transport devices 412, transfer robot 518, destination information database 512, and wireless access point 514 over a network.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

In one exemplary application, system 500 can be used for consolidating parcels for shipping. For example, a parcel processing site may use system 500 to sort parcels by destinations (e.g., zip codes or delivery routes) for subsequent shipment processing. Unsorted letters and/or packages can be collected into large article receptacles and then system 500 can facilitate sorting those into smaller article receptacles for different delivery routes/destinations. There is a high need for compact and modular sortation of articles beyond parcels though and system 500 can similarly be applied to those applications.

In another exemplary application, system 500 can be used for returned good processing and/or good restocking. For example, mixed article receptacles of returned goods could be appropriately sorted for reshelving, restocking, or other subsequent processing. In another example, newly received article orders could be sorted into appropriate receptacles for replenishing article stock within a store. The size and automated affordances of system 500 is such that it could be used in a variety of environments such as in a back-warehouse of a retail store or in an order fulfillment center (e.g., such as for ecommerce returns).

In another exemplary application, system 500 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In a similar manner, system 500 may also be used for dynamic or custom kitting for industrial or consumer goods.

Article receptacles may be generally signaled for discharging (using an autonomous or semi-autonomous approach) when the article receptacle satisfies a capacity condition. The capacity condition may be based on how full or overfilled the article receptacle is or whether an order has been completed. However, the method can additionally model expected time and availability to exchange an article receptacle. For example, an article receptacle may be removed before it is at a capacity limit to avoid having too many article receptacles needing exchange at the same time. As another condition, an article receptacle may be discharged when the method determines a benefit to having a different mix of groupings allocated within the receptacle array. For example, an uncommon article receptacle may be discharged when it has few articles such that a new article receptacle placed in that position can be reassigned to a different grouping.

System 500 including sleeve 301 may provide a number of potential benefits as noted herein. System 500 is not limited to always providing such benefits and is presented only as exemplary representations of how system 500 may be put to use. The list of benefits is not intended to be exhaustive and other benefits may additionally or alternatively exist.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system for use in directing a sorting operation, the system comprising:

a server comprising a memory, a processor, and a receptacle assignment engine;

a plurality of receptacles configured for receiving articles therein, each receptacle defined by at least one side wall and a floor that together define a receiving space for one or more articles;

a sleeve removably attached to the receptacle such that a lower portion of the sleeve contacts an inner surface of the at least one side wall of the receptacle, with an upper portion of the sleeve extending upward above a top rim of the receptacle and defining an opening that permits access to the receiving space of the receptacle; and, one or more automated transport devices for transporting and depositing articles into the receptacles;

wherein the system configured to:

direct the one or more automated transport devices to transport and deposit a first count of articles into the receptacle after the sleeve is removably attached over a top region of the receptacle.

2. The system of claim 1, wherein the system is further configured to move the receptacle to one of: a packing station, and a location of further processing.

3. The system of claim 1, wherein the system is further configured to sort the articles for one of: reshelving, restocking, and subsequent processing.

4. The system of claim 1, wherein the system further comprises a mobile robot for removing the receptacle and replacing it with an empty receptacle.

5. The system of claim 1, wherein the system further comprises a crane operable to move vertically and horizontally along a side of a sorter forming part of the system.

6. The system of claim 1, wherein the system further comprises a transfer robot operable to unload the receptacle carried on a chamber bank.

7. The system of claim 1, wherein the system further comprises a transfer robot configured to remove and replace the receptacle with an empty receptacle.

8. The system of claim 1, wherein the system is further configured to direct an automated device to transport the receptacle to a location of further processing.

9. The system of claim 1, wherein the server is configured to direct one of: a person, a robot, and an automated device to transport the receptacle to a location of further processing.

10. The system of claim 1, wherein the system is further configured to direct sealing of the receptacle prior to shipping the receptacle to one of: a store address, and a customer address.

11. The system of claim 1, wherein the system is further configured to transport the receptacle to a location of further processing where the receptacle is one of: closed and sealed.

12. The system of claim 1, wherein the system is further configured to assign a receptacle located closest to an article induction point to a destination that is to receive a greatest number of articles.

13. The system of claim 1, wherein the server is configured to one of: calculate, and estimate a time instant when the receptacle will get full.

14. The system of claim 1, wherein the first count of articles is compressed at a location of further processing such that a total volume of the first count of articles is less than a total volume of the receptacle.

15. The system of claim 1, wherein the sleeve fitted onto the receptacle is removed at a packing station before the receptacle is one or more of: closed or sealed.

16. The system of claim 1, wherein the system is further configured to sort the articles for one of: delivery routes, and delivery destinations.

17. The system of claim 1, wherein the system is further configured to associate multiple receptacles with a single destination ID.

18. The system of claim 1, wherein the system is further configured to determine one receptacle among a plurality of receptacles to deposit an article thereinto based on an identifier of the article.

19. The system of claim 1, wherein a fill level of the receptacle is detected by a sensor.

20. The system of claim 19, wherein the sensor is in one of: a two-way communication, and a two-way communication, with the server.

21. The system of claim 19, wherein the sensor is configured to sense whether the receptacle is one of: empty, underfilled, filled, overfilled, and ready to receive articles.

22. The system of claim 1, wherein a beam from a light curtain senses one of: a level to which the receptacle is filled up, and when the receptacle is full.

23. The system of claim 1, further comprising one or more of a: load cell, proximity sensor, and RFID tracking system, for monitoring the system.

24. The system of claim 1, further comprising a dimensional camera for dimensioning the article.

25. The system of claim 1, further comprising one or more of: a side barcode scanner, a top barcode scanner, and a bottom barcode scanner.

26. The system of claim 25, further comprising a transparent shield positioned above the bottom scanner.

27. The system of claim 1, wherein the system is further configured to associate the article carried on the transport device with a specific receptacle based on an identifier of the article.

28. The system of claim 1, wherein the server is configured to direct replacement of the receptacle that is full with a second receptacle.

29. The system of claim 1, wherein, when the system determines that the receptacle is full after the system has dispatched a transport device to the receptacle, the system is further configured to re-route the transport device to a second receptacle.

30. The system of claim 1, wherein the system is further configured to minimize a total distance traveled by all transport devices to fill a specific receptacle.

* * * * *